United States Patent [19]

Grimshaw et al.

[11] Patent Number: 5,078,592

[45] Date of Patent: Jan. 7, 1992

[54] HEATING SYSTEM FOR COMPOSITE TAPE

[76] Inventors: Michael N. Grimshaw, 1177 Valley Forge, Milford, Ohio 45150; Paul A. Zaffiro, 6352 Montgomery Rd., Apt. #9, Cincinnati, Ohio 45213

[21] Appl. No.: 508,380

[22] Filed: Apr. 9, 1990

[51] Int. Cl.⁵ .............................................. F27B 9/28
[52] U.S. Cl. .................................... 432/59; 156/359; 34/54
[58] Field of Search ............. 156/379.9, 380.9, 497, 156/499, 166, 176, 359; 34/155, 156, 54, 148; 432/59, 8

[56] References Cited

U.S. PATENT DOCUMENTS

| | | | |
|---|---|---|---|
| 2,707,369 | 5/1955 | Pullman | 156/176 X |
| 3,574,040 | 4/1971 | Chitwood et al. | 156/522 |
| 4,719,397 | 1/1988 | Kneifel et al. | 318/567 |
| 4,790,898 | 12/1988 | Woods | 156/166 |
| 4,797,172 | 1/1989 | Hebert et al. | 156/425 |
| 4,822,444 | 4/1989 | Weingart et al. | 156/441 |

OTHER PUBLICATIONS

Publication No. 8707-1 "Automated Tape Layup of a BMI Vertical Stabilizer Skin", by M. Grimshaw, J. Beard, Jr., M. Schultz. Reprinted from Advanced Composites III: Expanding the Technology.
Cincinnati Milacron publication COMPOSITES COMMENT, vol. 2, No. 1 Jan.–Mar., 1988; pp. 1-4 "Milacron Composite Tape Layer Used Successfully for Deposit of Bismaleimide (BMI) Resins" by J. Bear and M. Grimshaw.
Cincinnati Milacron Publication No. SP-152-3, May, 1988, pp. 6, 7, 10, 11.
Cincinnati Milacron Publication No. SP-158-1, Mar. 1989, Plastics Engineering, May 1981, pp. 37-46 "RU Reinforcing Plastics with Robots?"

Primary Examiner—Henry A. Bennet

[57] ABSTRACT

Composite tape is heated from both sides by cooperating subsystem. The system at one side has a heating chute with resistance heaters, controller and thermocouple for maintaining a heating chute temperature setpoint. $T_{chute}$. The opposite side of the tape has hot air selectively played on it by the other subsystem, comprising an air distribution box, air heater, controller and thermocouple for maintaining air at the tape face at an air heater setpoint temperature, $T_{air}$.

9 Claims, 10 Drawing Sheets

Fig_11

5,078,592

HEATING SYSTEM FOR COMPOSITE TAPE

BACKGROUND OF THE INVENTION

I. Field of the Invention

This invention relates to heating systems by which to heat the plastic matrix of a travelling web of fiber reinforced composite tape for application by a tape dispensing apparatus. More particularly, the present invention relates to a heating control system in which heating and temperature control of the plastic matrix of the travelling web is reliably accomplished irrespective of the velocity or changes in velocity of the travelling web.

II. Description of the Prior Art

By way of background, computerized tape laying machines have been utilized to apply laminated strips of composite tape material to a lay-up tool to form a part such as an aircraft wing, for example. One such composite tape material includes graphite fibers embedded in a thermosetting plastic matrix. To apply the tape, a computerized tape laying machine may include a tape dispensing head which is movable under computer control relative to the lay-up tool to lay courses of tape to build up multiple plys of tape, forming the desired part. An example of one such system is described in U S. Pat. No. 4,719,397 assigned to the assignee hereof, the disclosure of which is incorporated herein by reference.

Conventionally, tape dispensing apparatus of the type described in U.S. Pat. No. 4,719,397 have been used to apply thermosetting composite tape to the lay-up tool. Thermosetting composite tape is fairly moldable and usually tacky at or around room temperature. Although many thermosetting composite tapes have some natural adhesive properties in the matrix, bismaleimide (BMI) composite tape has little tack at ambient temperature and, thus, will resist adherence to previous plys of such tape or to a tool surface. Additionally, in its natural state, composite tape material is relatively stiff and virtually inflexible in sidewise directions. i.e., in the plane of the tape.

Certain prior art machines have employed heaters for heating composite tape, from one side of the tape. For example, infrared or quartz bulb heaters have been proposed for heating thermoplastic composite tape, i.e. tape which may be heated to such point where plys may be melted together. Heated shoes and hot air have been employed to heat both thermoplastic and thermosetting composite tape. Additionally, at least one prior art device, shown in U.S. Pat. No. 4,133,711 at FIG. 22 shows that thermosetting tape which is separated from its carrier backing paper for purposes of cutting the tape alone, may be reattached after cutting, by passing the backing paper and cut composite tape through a clamp apparatus which employs a heating coil.

The various movements of the state-of-art machine systems result in widely fluctuating velocities of the tape as it is applied to the surface. For example, the tape may be moving at a velocity between 0 and 20 inches per second, and with possibly dramatic changes in velocity. And, for example, if heater bulbs are energized to emit radiant energy at a level sufficient to heat the plastic matrix when the tape is moving relatively slowly, such as at 1 inch per second, the matrix will not be properly heated when the tape is moving relatively rapidly. Moreover, unless the energy level for the heater is raised accordingly, the tape will not be properly heated as it accelerates. Similarly, if heater bulbs are energized to emit radiant energy at the higher level necessary to heat the plastic matrix during periods of high speed travel of the tape, the tape may be burned or otherwise damaged as the tape velocity is reduced. Thus, heating of the tape must be carefully regulated so that proper heating is achieved without burning or otherwise damaging the tape.

In the case of prior art machines using a heated compaction shoe or roller, very little surface is in contact with the back of the tape, and the front of the tape is laid to an unheated structure, such that insufficient heating of the tape occurs.

We have identified that it is desirable to heat some composite tapes, whether they be unbacked, or comprise a tape assembly where, for instance, the tape is carried on a thin backing paper from the tape supply reel to the compaction shoe.

Tape heating may be desirable for many reasons, two of which are (1) certain types of thermosetting composite tapes, for example, bismaleimide (BMI), have very little tack and it is thus desirable to enhance the tack when creating laminated structures; and (2) in the processing of composite tape structures, lay-up tools may have a variety of contours, and, since the relatively stiff tape does not easily conform to contours into which it is "steered" (i.e., the tape is directed sidewise, in the plane of the tape), and the tape is more steerable at elevated temperatures.

We have determined that composite tape (either alone, or in combination with a backing as a tape structure), is advantageously heated by a heating system which applies heat from both sides of the tape, and preferably, where the heating system comprises apparatus with a defined length along the tape path, located close to the tape laydown zone.

SUMMARY OF THE INVENTION

It is an object of the present invention to provide an effective tape heating apparatus where the temperature of composite tape may be raised to such point that its tack properties are enhanced.

Another object of the present invention is to provide a heating apparatus which will reliably heat composite tape while the tape web is moving.

A further object of the present invention is to provide a heating apparatus which will reliably heat composite tape prior to being dispensed onto a laydown surface, thereby enhancing the steerability of the tape.

In accordance with the foregoing objects, the invention is shown embodied in an apparatus for heating to a processing temperature fiber reinforced composite tape travelling along a tape path for application to a surface at a tape laydown point comprising:

first heating means proximal one face of the tape, for transferring heat to the tape from that face;

second heating means proximal the opposite face of the tape, for heating the tape; and means for controlling the second heating means in response to the temperature of fluid in fluid communication with the opposite face of the tape.

DESCRIPTION OF THE PREFERRED EMBODIMENT

Figure 1:
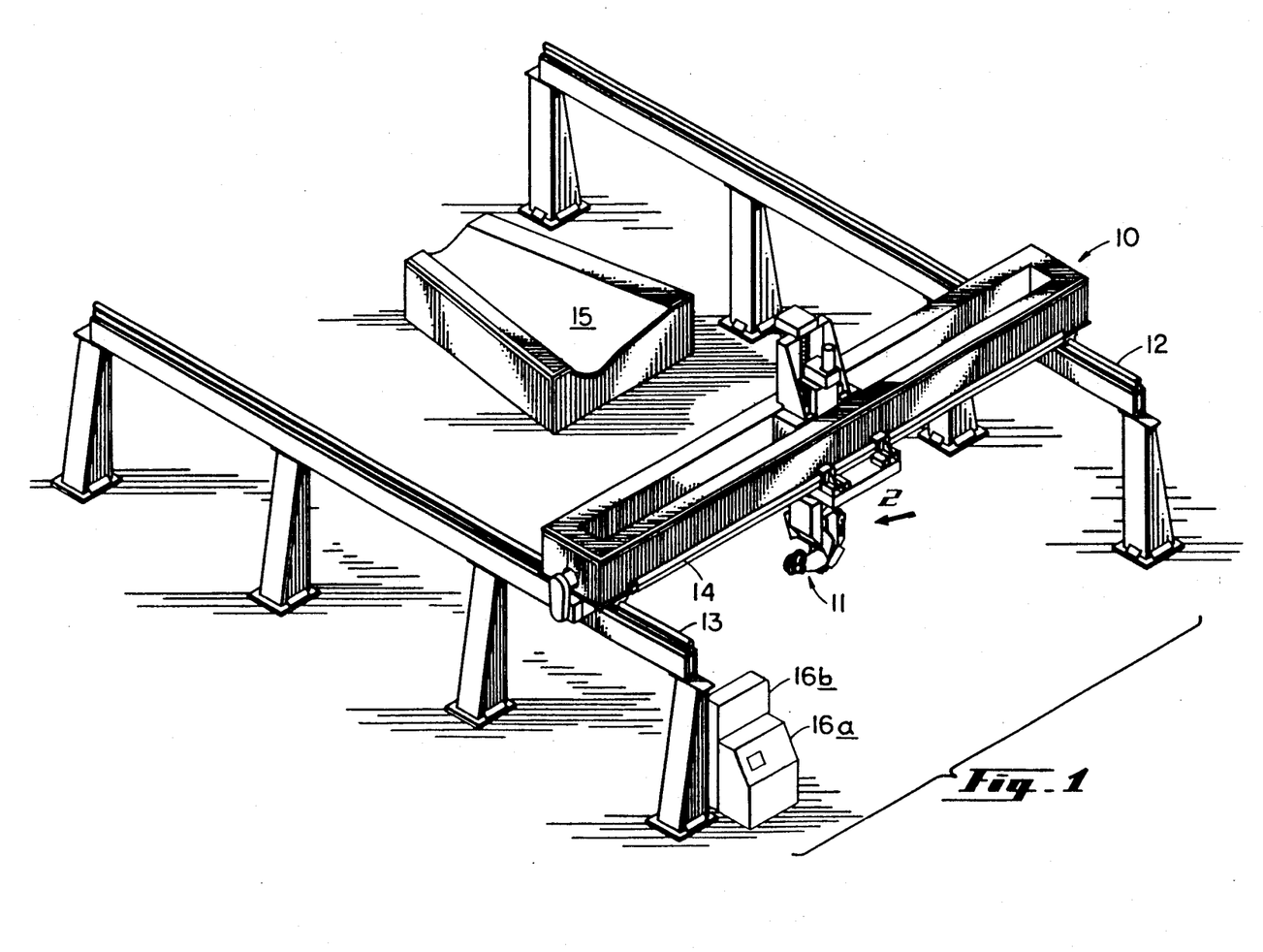
FIG. 1 is a perspective view of a composite tape laying machine.

FIG. 1 of the drawings depicts a high rail gantry tape laying machine 10 wherein a tape laying head 11 is transported coordinately on side rails 13 and transverse gantry rails 14. A tool 15 having a contoured tape laydown surface is positionable with respect to the rails 13,14, within the range of the tape laying head movement, to form laminated composite structures. The machine 10, bearing the trademark CTL, is available from Cincinnati Milacron Inc., the assignee of the present invention. A CNC (computer numerical control) 16a is provided to direct machine movements, and is available under the trademark ACRAMATIC, Model 975C, from Cincinnati Milacron Inc. The machine also includes an electrical cabinet 16b.

Figure 2:
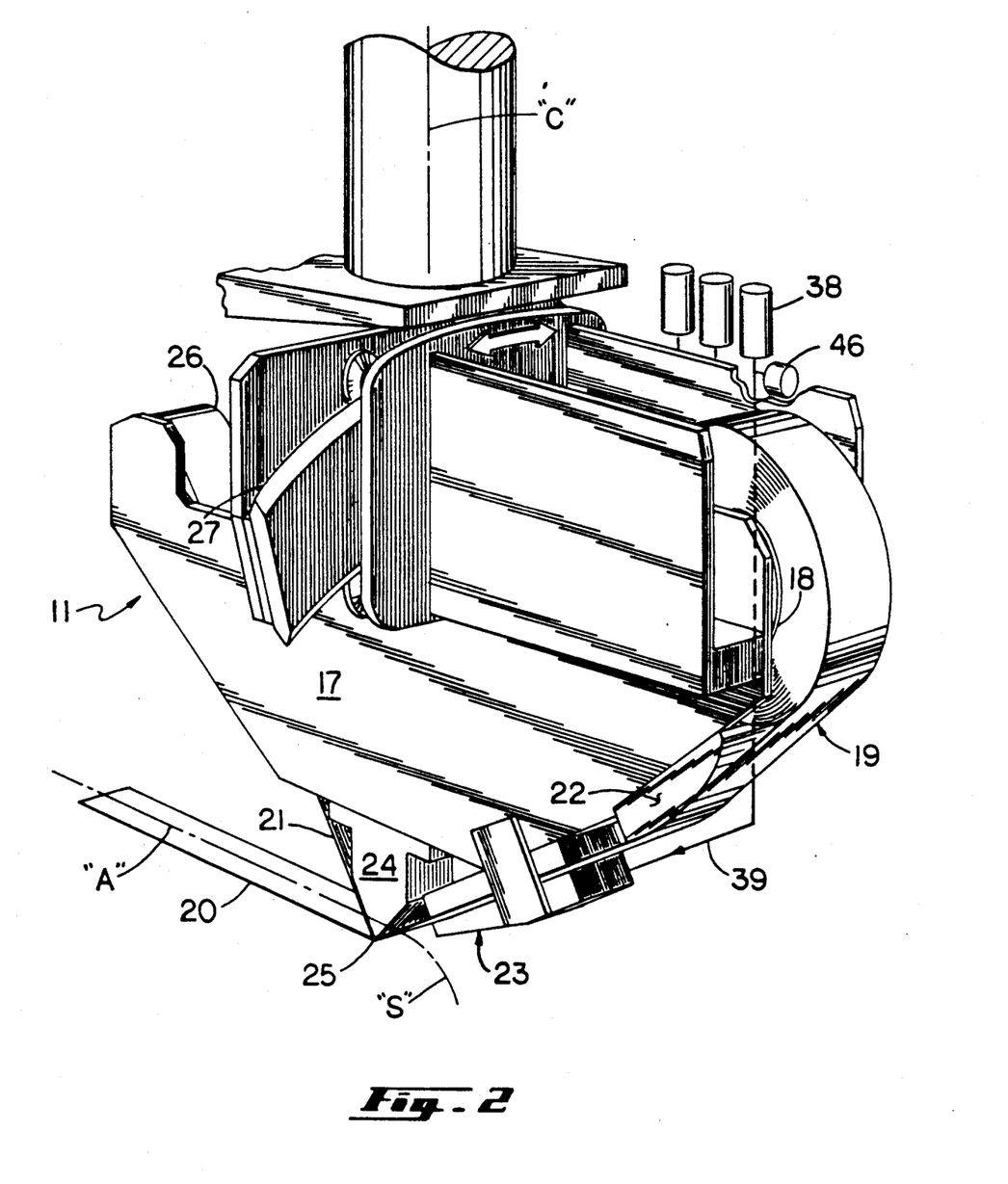
FIG. 2 is a perspective view of the tape laying head of the tape laying machine of FIG. 1.

The close-up perspective view of FIG. 2 illustrates the tape laying head 11 as comprising in part, a mainframe 17 supporting a tape supply reel 18 carrying a tape structure 19 comprised of filamentous composite tape 20 adhered to a backing paper 21. The tape structure 19 is trained through a tape guide chute 22, which cooperates with a cutter assembly (removed for purposes of clarity). The tape structure 19 then passes through a tape heater assembly 23 on its way to a tape compaction shoe 24 at the lay-down point 25. Immediately after the tape laydown point 25, the backing paper 21 is accumulated on a take-up reel 26 supported on the mainframe 17. The mainframe 17 is rotatable on a circular way system 27 about the tape laying path axis, "A", and also rotatable about a vertical "C" axis.

Here it may be noted that in prior art machines, without a heater assembly, the "C" axis is primarily used for orienting the head 11 to angle plies of tape on the tool. In the present assembly, however, the "C" axis may be programmed to steer the tape 20 from its normal, essentially straight-line "A" axis, i.e., where the tape 20 may be veered in a sidewise curvilinear direction "S"—permissible because the tape matrix is sufficiently heated by the heater assembly 23.

The electrical cabinet 16b carries a pair of substantially identical heater controls 28a,b, in this case, a EUROTHERM Model 818 PID controller, which is able to provide an electrical power output through a suitable amplifier 29 to a target, and control the power supplied to the target in response to a feedback signal provided by a thermocouple (see FIG. 3), in a well-known manner. Both controls 28a,b, receive electrical power from a remote source (not shown), and the source power is converted to a working power output of the control.

Figure 3:
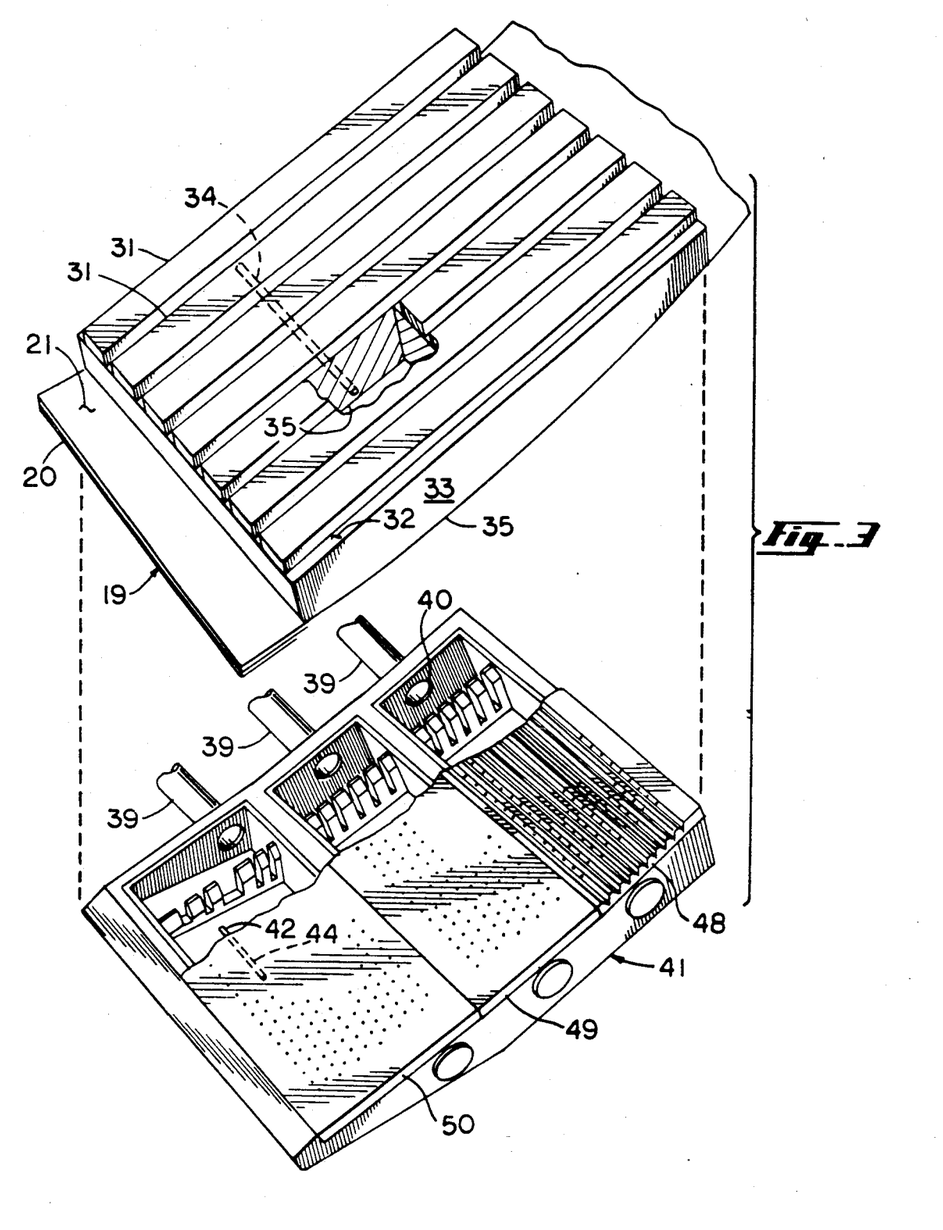
FIG. 3 is a perspective view, in partial broken-away section showing the tape chute and air distribution box.
Figure 4:
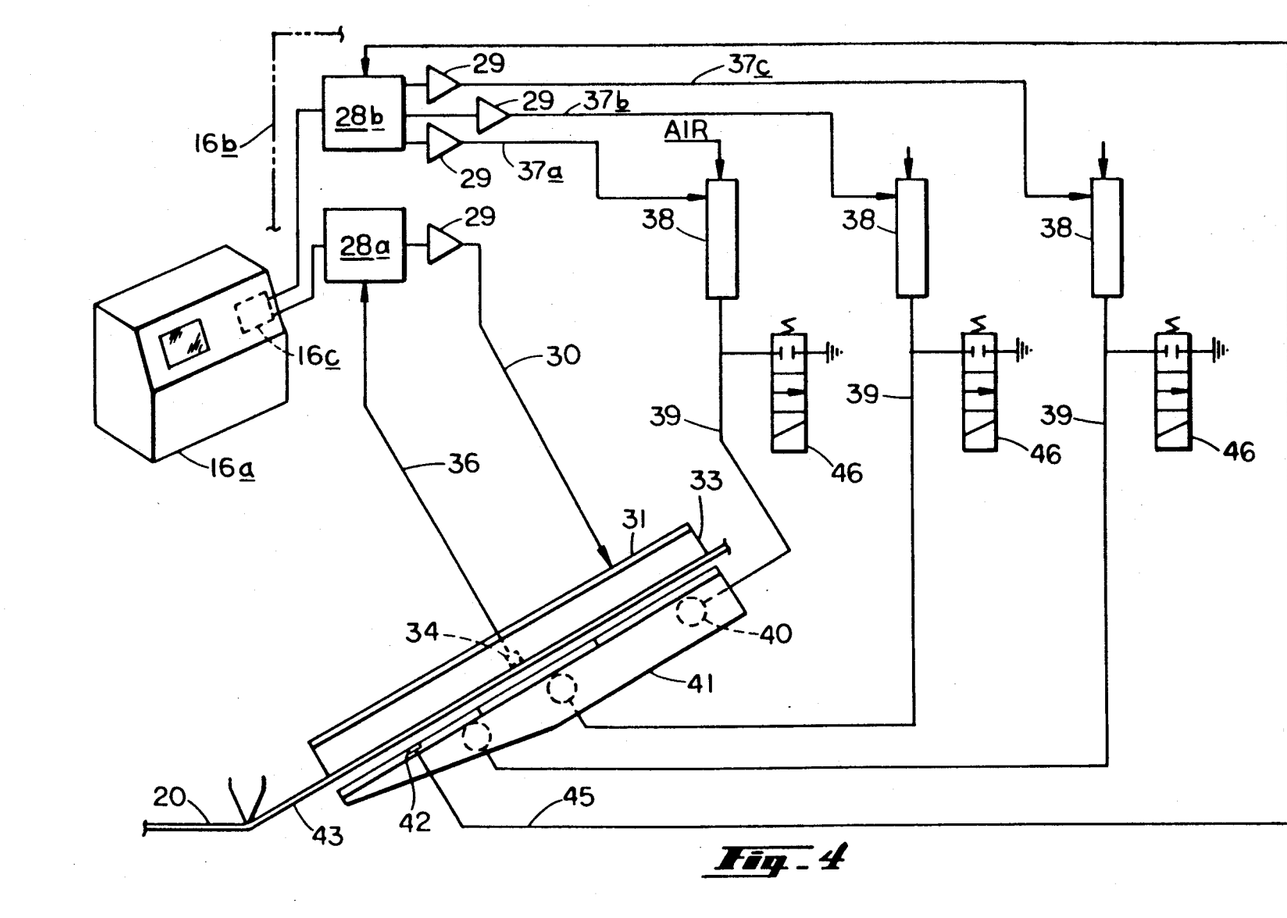
FIG. 4 is a schematic view of the tape heating system.

Referring to FIGS. 3 and 4, along with FIG. 2, the first control 28a provides electrical power (0–100 VAC@60 Hz) along an output line 30 to a plurality of resistance-type strip heaters 31 bonded to the back face 32 of an aluminum heating chute 33, for maintaining the chute 33 at a desired temperature $T_{CHUTE}$, set by the control 28a. A feedback thermocouple 34 is mounted within the heating chute 33, for sensing a point proximal the front working surface 35 of the heating chute 33, and the thermocouple 34 provides a feedback signal along a line 36 to the control 28a.

In the preferred embodiment, seven strip heaters 31 were spaced to accomodate six inch (152.4 mm) wide composite tape 20. When using other width tape strip heaters 31 may be added or omitted from the heating chute design. For example it is contemplated that when using three inch (76.2 mm) wide tape 20, the heating chute 33 would employ the three centermost strip heaters 31.

The other control 28b provides electrical power (0–200 VAC@60 Hz) along output lines 37a,b,c connected to three identical hot air torches 38 mounted to the mainframe 17. The torches 38 available from Sylvania Electric Products Inc. receive compressed air from a supply source (not shown). The air is heated by internal resistance heaters (not shown) and then supplied along fluid connection lines 39 to three inlet ports 40 at the hot air distribution box 41. The hot air is supplied at a controlled supply temperature, $T_{air}$, in to a thermocouple 42 which is mounted at the surface of the box 41 to sense the air adjacent to the front face 43 of the tape 20. The thermocouple 42 is cemented into a groove 44. The thermocouple 42 provides a feedback signal along a line 45 to the control 28b in the electrical cabinet 16b. The hot air distribution box 41 is mounted a slight distance away from the tape 20, approximately 0.25 inch (6.35 mm), and is shown at an exaggerated gap in FIGS. 2,3, and 4. The preferred embodiment also includes dump valves 46 for the fluid connector lines 39 leading from the hot air torches 38, where the dump valves 46 are solenoid-operated, spring-return, two-way valves which can unload the hot air to the atmosphere.

Referring to FIG. 3, the perspective view, in partial broken-away section, illustrates that the heating chute 33 is a solid aluminum block, with a plurality of strip heaters 31 bonded to the outside surface 32 away from the composite tape 20. The thermocouple 34 is buried within the heating chute 33 at a position near the curved face 35 of the chute 33 which contacts the composite tape structure 19. It should be noted that the heating chute 33 may be mounted in running contact with the tape structure 19 or may be spaced a small distance away, according to the user's concerns for such factors as tape and backing materials. The composite tape 20 is carried on a thin backing paper 21 which does not appreciably impede the transfer of heat.

Figure 8:
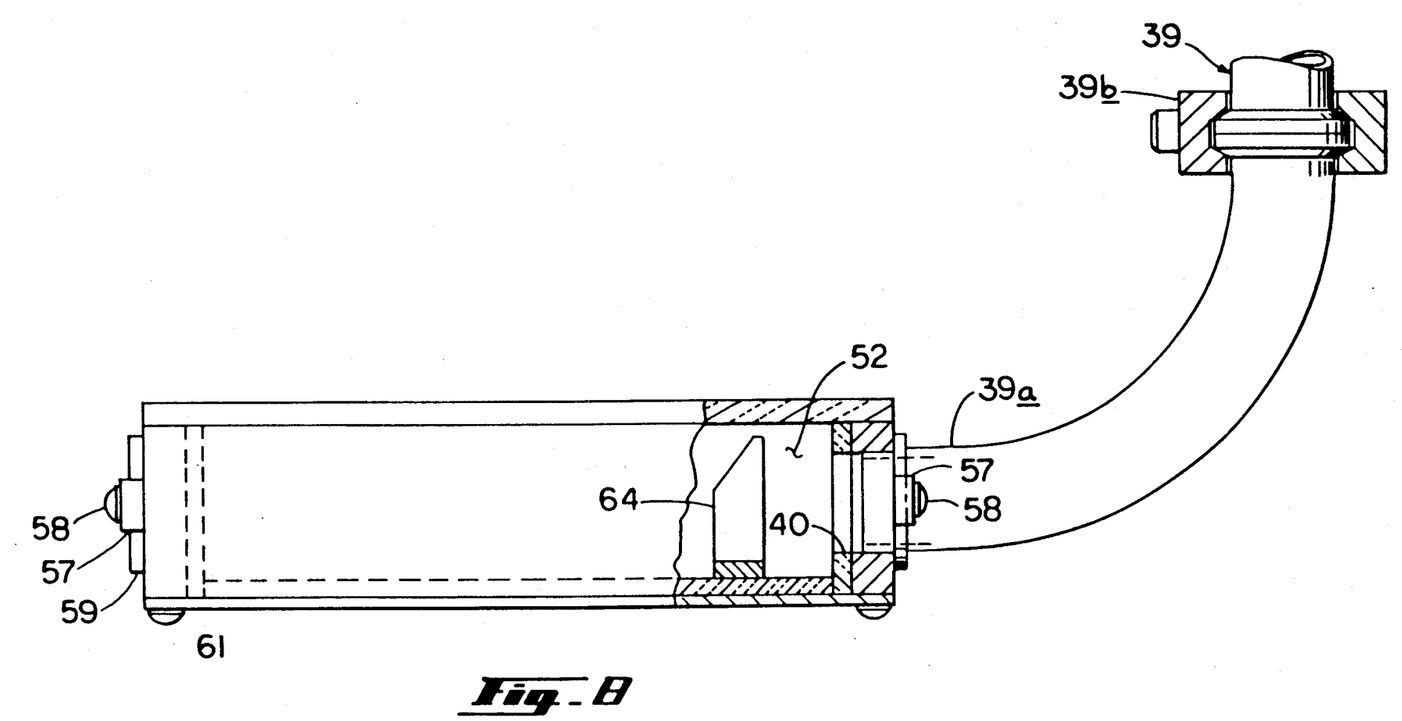
FIG. 8 is an end view of the hot air distribution box, taken along the line 8—8 of FIG. 5.

Referring to FIG. 3 and FIGS. 5-8, concurrently, the hot air distribution box 41 is basically configured as a shallow rectangular box where the bottom surface 47 is beveled to provide clearance for tool contours, and the top is configured to receive three nozzle plates 48,49,50, which are arranged to be substantially parallel to tangents spaced along the curvature of the tape 20. A shell 51 consitutes the sides of the box 41, the shell 51 being machined from a solid block of aluminum, forming three discrete compartments 52,53,54 along the tape path, each compartment 52,53,54 being fitted with a respective nozzle plate 48,49,50 on its top side. Bottom covers 55,56 are provided to enclose the compartments 52,53,54, and inlet ports 40 are machined through both sides of the shell 51 at the compartment ends, so that hot air may be optionally provided at either end. As shown in FIG. 8, the hot air supply line 39 is shown having a flanged elbow 39a which is inserted into the hot air port 40 and affixed by means of clips 57 and screws 58. The opposite end of each compartment 52,53,54 has a solid cover 59 with clips 57 and screws 58. The hot air supply line 39 may be fitted with a suitable union connector 39b to provide a convenient joint for assembly. To lower the thermal inertia of the box 41 and thus the heating and cooling time lag, and to generally keep the shell temperature down, the shell 51 is machined to provide only a minimum amount of solid aluminum necessary to support screws 60,61,62 which affix the nozzle plates 48,49,50 and covers 55,56. The inner surfaces of the shell compartments 52,53,54 and the bottom covers 55,56 are surfaced with insulation 63 to limit heat transfer from the air to the shell 51. The insulation 63 is approximately 0.250 inch (6.35 mm) thick and is commercially available from the Carborundum Company under the trademark FIBERFRAX 970 insulating paper. The insulation 63 has an extremely low thermal conductivity, 0.058 W/m° C., comparable to a value of 0.026 for air.

The insulation 63 can be glued or fastened although gluing is preferred from a thermal standpoint, using a ceramic or other similar high temperature adhesive. The outer surface of the box 41 should be blackened to maximize radiation heat transfer from the box 41 thereby keeping it as cool as practical without need for a forced convection fan.

Each compartment 52,53,54 is provided with a slotted baffle plate 64,65,66 located near the air inlet port 40 and secured by screws 67, in order to diffuse the incoming air velocity.

The three nozzle plates 48,49,50 are machined from ceramic material, Zircar, type Zal-45, available from Zircar Products, Inc., Florida, New York. Since Zircar is a good insulator, it is has no additional insulation on the underside.

Figures 5, 7:
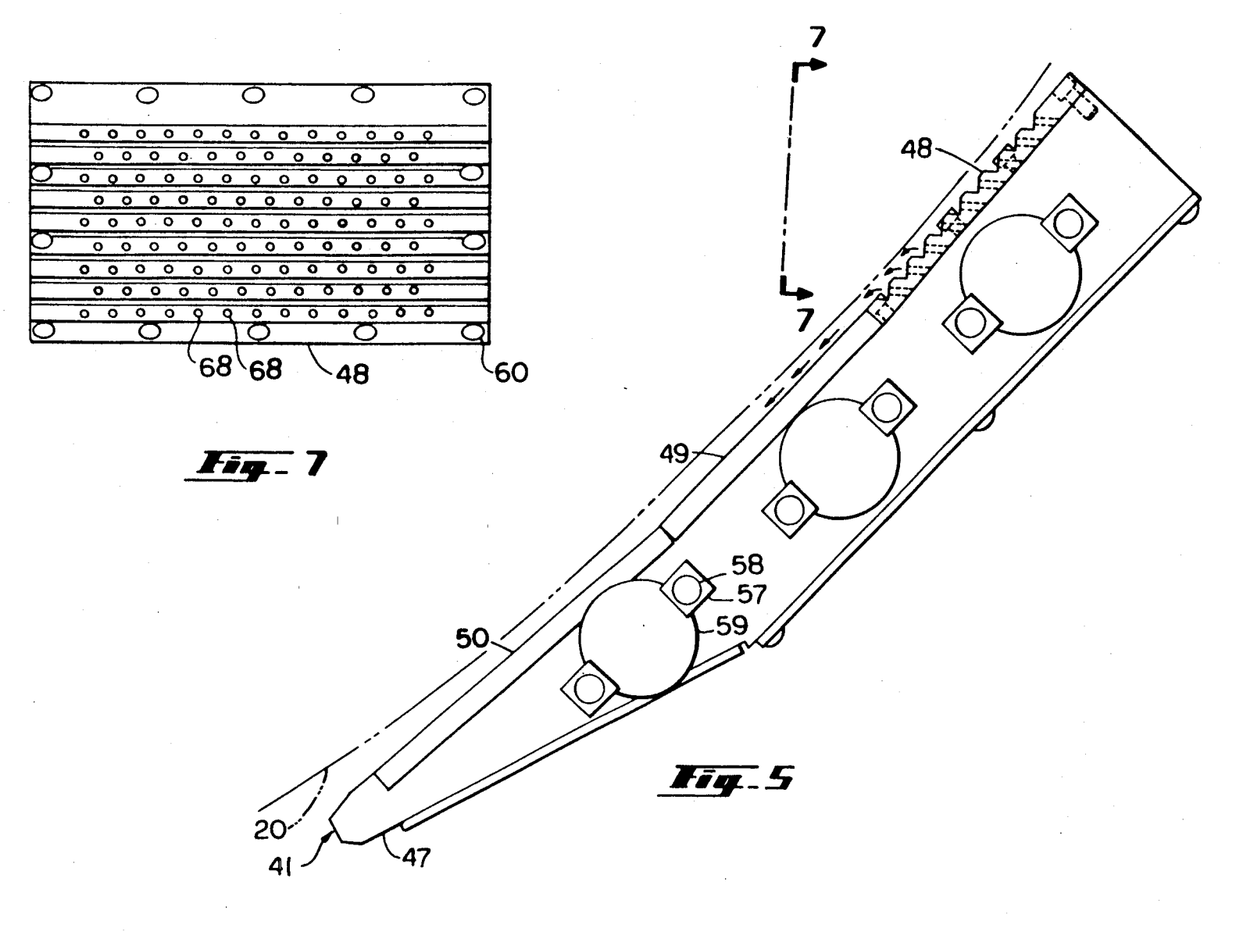
FIG. 5 is a side elevational view of the hot air distribution box.
FIG. 7 is a view of a nozzle plate, taken along the line 7—7 of FIG. 5.
Figure 6:
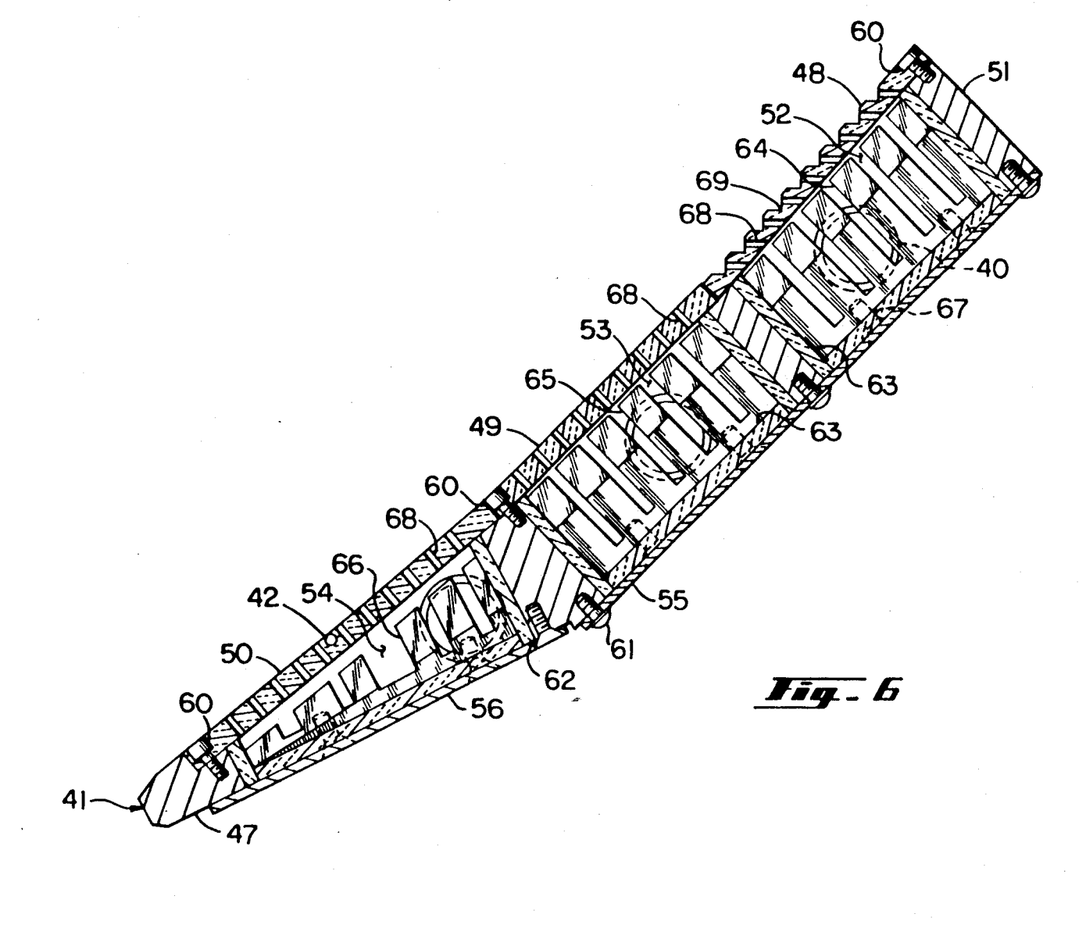
FIG. 6 is a side elevational section through the hot air distribution box of FIG. 5.

The nozzle plates 48,49,50 are provided with a plurality of small holes 68 to distribute the hot air uniformly over the tape surface 43. As shown in FIGS. 5,7, the first nozzle plate 48 is provided with a plurality of parallel V-shaped grooves 69 machined across its full width, so that the nozzle outlet holes 69 may be drilled at an angle to the plate 48 to thereby direct the flow of hot air from the first compartment 52 downwardly along the path of travel of the tape 20. The remaining two nozzle plates 49,50 have their outlet holes 68 drilled normal to the faces of the plates. The purpose of angling the holes 68 of the first nozzle plate 48 is three-fold: (a) the momentum of the downward flow will tend to carry the outlet air from the following two nozzle plates 49,50 along the path of the tape to effectively utilize the heat provided by the hot air; (b) residual heat of exiting air will be directed against the laydown surface in advance of the tape; and (c) to avoid a situation where the leading edge of a next-successive piece of tape carried into the tape heater assembly 23 might tend to lift off the backing paper 21.

Heating System Operation

The heating chute 33 provides most of the process heat at lower desired tape temperatures and feed rates, and the chute temperature $T_{CHUTE}$ is set as follows:

$$T_{CHUTE} = T_{DES} + 7° F. (2.6° C.) \qquad [I]$$

where
$T_{CHUTE}$ = temperature of chute, ° F. (° C.); and
$T_{DES}$ = desired tape temperature, ° F. (° C.), input to the CNC.

The CNC 16a utilizes a microprocessor 16c (see FIG. 4) which performs the necessary calculation and sets the chute control 28a. For example, if a user keys in a 100° F. (37.8° C.) desired tape temperature, $T_{DES}$, the microprocessor 16c automatically sets the chute temperature at 107° F. (40.4° C.). The chute is maintained at this temperature, independent of feed-rate, until a different desired tape processing temperature is keyed in.

Figure 9:
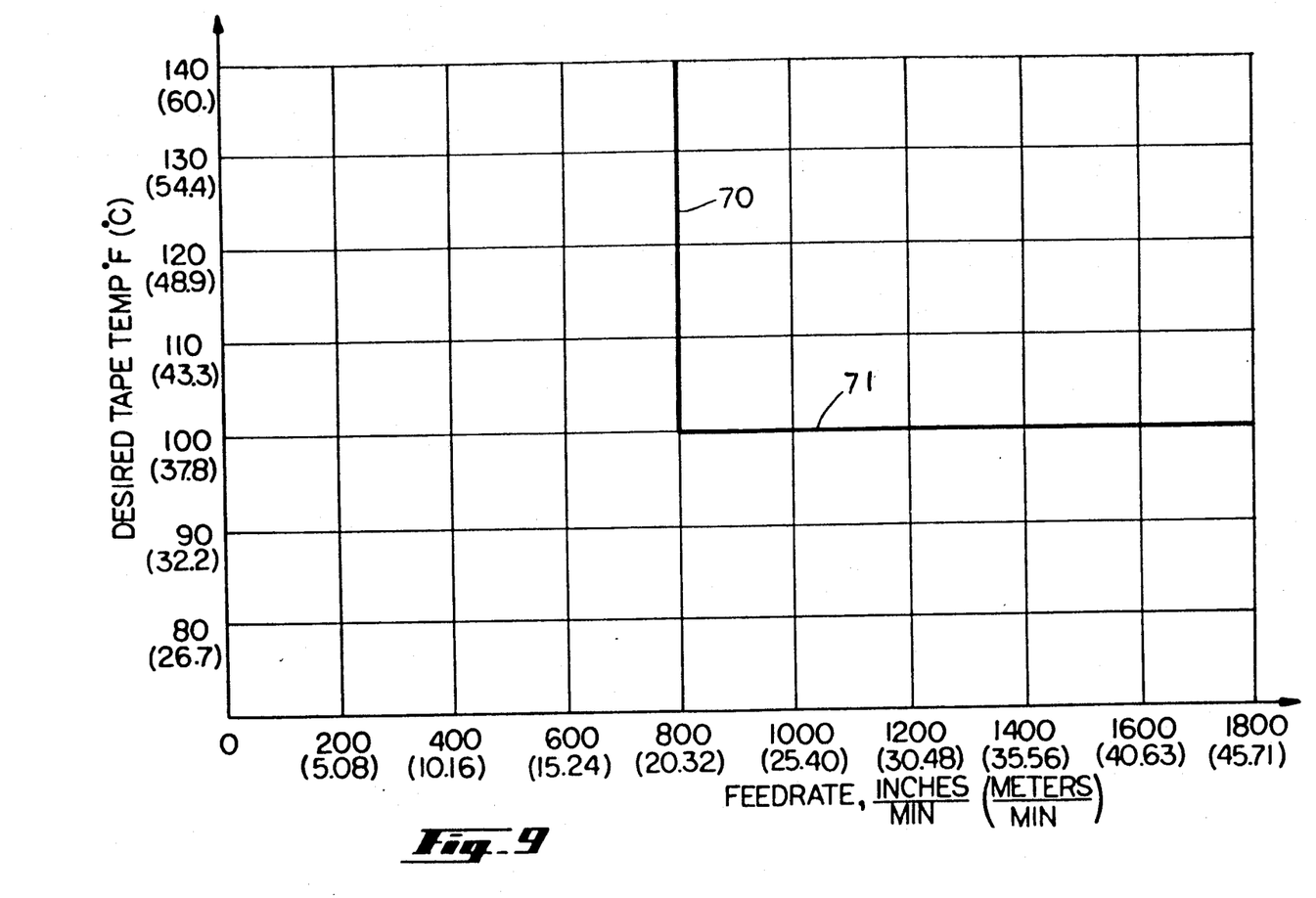
FIG. 9 is a graph used to apply the tape heating system.

The hot air system has two modes of operation:

(a) For a desired tape temperature, $T_{DES}$, below 100° F. (37.8° C.) or tape feed rate, V, not exceeding 800 inches/minute (20.32 meters/minute), the chute 33 provides most of the process heat, and the air temperature, $T_{air}$, is set at an "idle" temperature, equal to the desired tape temperature, $T_{DES}$. For the example above, the "idle" air temperature, would be set by the programmable controller at 100° F. (37.8° C.). In this mode, the air assists the heating chute 33 by maintaining a constant air temperature equal to the desired tape temperature, $T_{DES}$. Conditions for this mode are graphed in FIG. 9, as represented by the area to the left of the heavy ordinate 70, and below the heavy abscissa 71.

(b) If the tape feed rate, V, exceeds 800 inches/minute (20.32 meters/minute) or the desired tape temperature, $T_{DES}$, exceeds 100° F. (37.8° C.) the air temperature, $T_{air}$, is determined by an empirical air equation in the microprocessor 16c as follows:

$$T_{air} = 2.094 T_{DES} - 0.268 V + 0.0018(T_{DES})(V) - 0.0089(T_{DES}^2) + 0.000063(V^2) \qquad [II]$$

where:
$T_{air}$ = air set point temperature, ° F.;
$T_{DES}$ = desired tape temperature, ° F.; and
V = desired tape feed rate, inches/minute As an example, to achieve a process tape temperature, $T_{DES}$, of 140° F. (60° C.) at 1800 inches/minute (45.71 meters/minute) with 3 inch (76.2 mm) wide tape, an air temperature, $T_{air}$, of approximately 290° F. (143.5° C.) is required.

Figure 10:
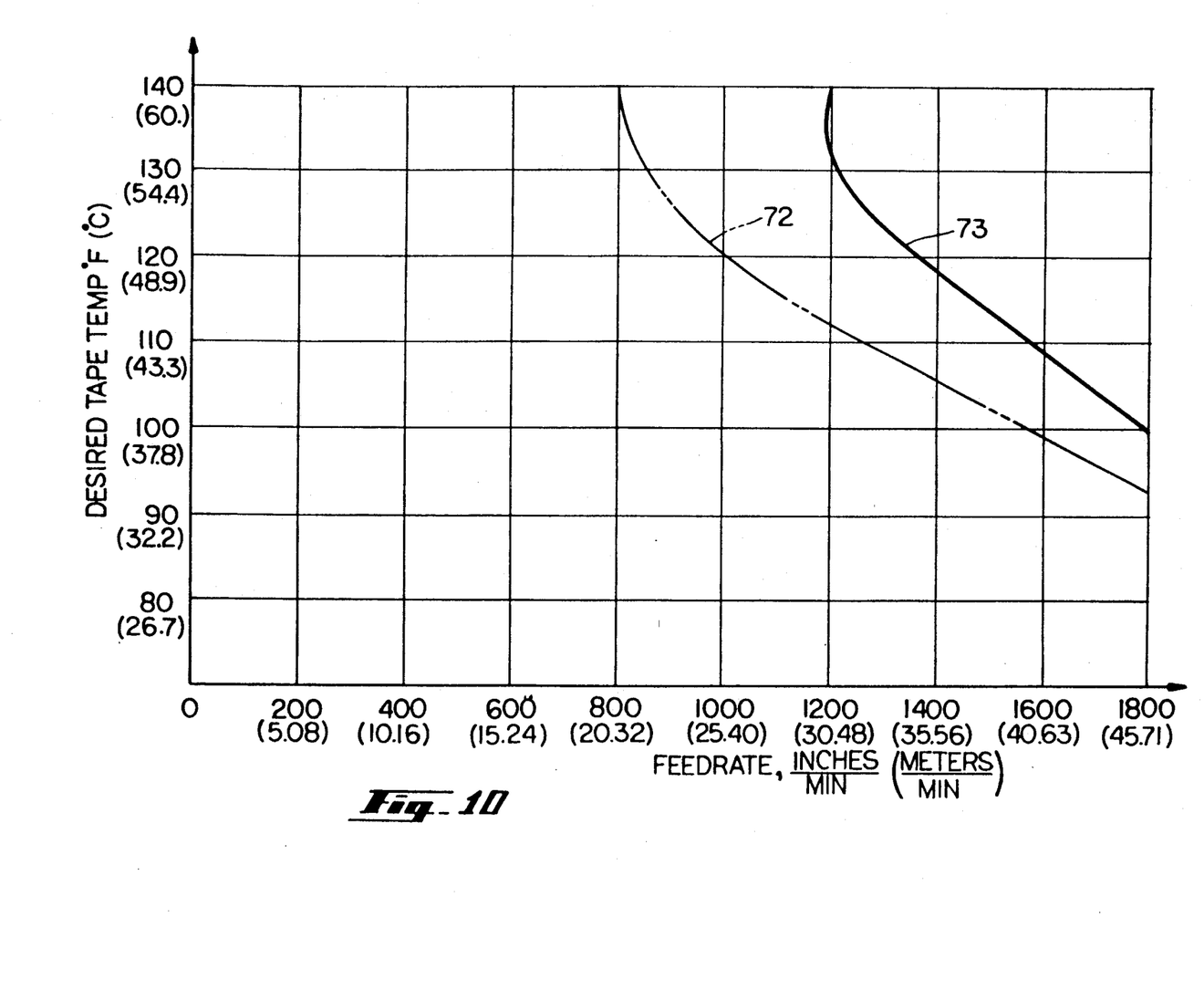
FIG. 10 is a graph of experimental data gathered from laboratory tests.

FIG. 10 depicts a graph reflecting laboratory tests run on three inch (76.2 mm) wide epoxy/graphite tape, of Fiberite Corp., at an initial tape temperature of 70° F. (21.1° C.) and ambient air temperature at 70° F. (21.1° C.), to ascertain the temperatures and feed rates where the heating system will cause the tape to meet a specified tolerance of ±9° F. (5.° C.) of the desired tape temperature $T_{DES}$, under actual tape laying conditions, i.e. including starting and stopping of typical tape laying runs. The area to the left of the broken line 72 is the region where the chute alone, without hot air, can heat the tape such that the tolerance is satisfied. The area between the broken and solid curved lines 72,73, shows those temperatures and feed rates where the heating assembly 23 will meet the specified tolerance at all times, using the heating chute 33 in combination with hot air. The area to the right of the solid line 73 is the region where the chute plus hot air cannot keep the tape within the tolerance band.

Figure 11:
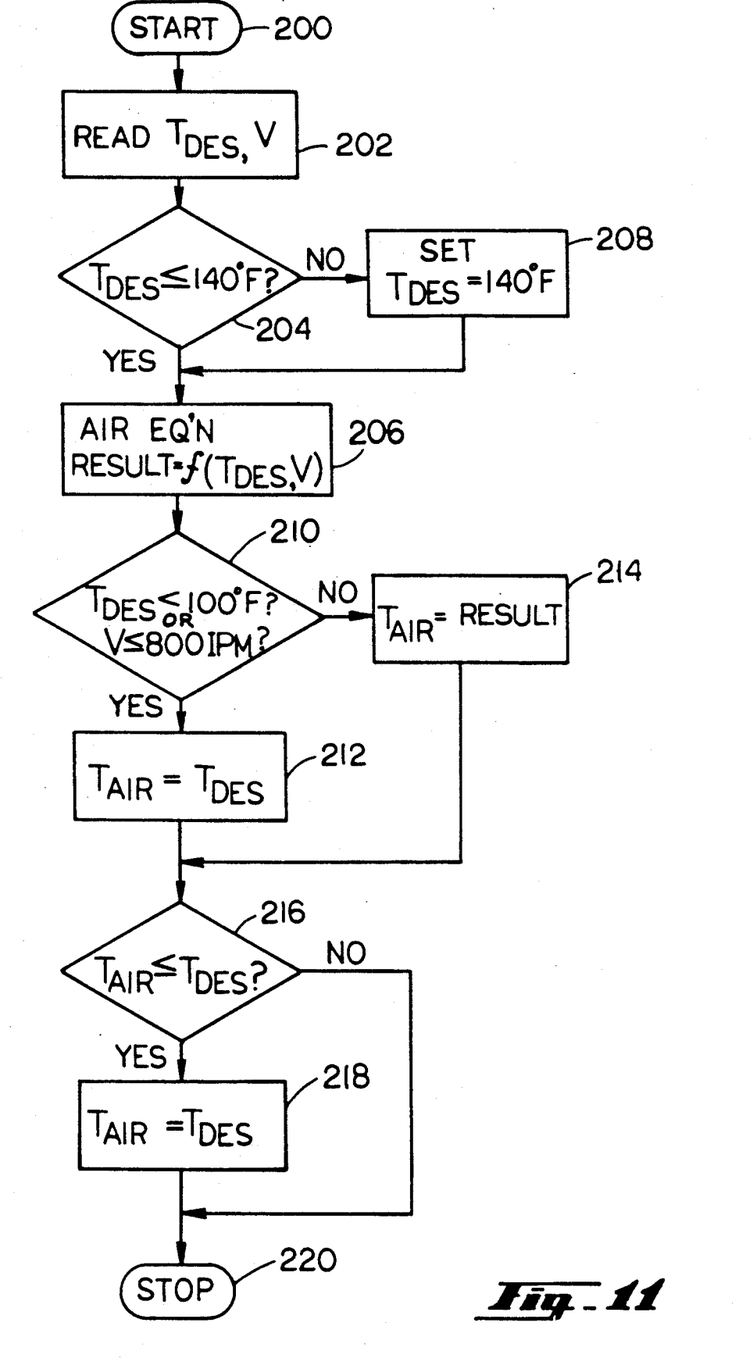
FIG. 11 is a block diagram of the computer heat processor routine.

Regulation of the hot air distribution box 41 may be accomplished in accordance with the flow chart of FIG. 11, which may be implemented by the microprocessor 16c, as a routine referred to as a "heater processor", indicated at step 200 of FIG. 11. With the heater processor routine begun, operation of the hot air system will proceed to sequence step 202, where the desired tape temperature, $T_{DES}$, and desired feed rate, V, are read.

From step 202, the desired tape temperature, $T_{DES}$, is compared to a 140° F. constant at decision step 204. If the desired tape temperature is equal-to, or less than 140° F., a "YES" output will cause $T_{DES}$ to be input to sequence step 206; a "NO" output to sequence step 208 will cause 140° F. to be input for $T_{DES}$ at sequence step 206.

Based on an input, hot air temperature is calculated at sequence step 206 as a function of $T_{DES}$ and V, in accordance with the empirical air equation [II]; the answer being held in a "Result" memory.

Next in the sequence, decision step 210 asks "is $T_{DES}$ less-than 100° F. or is V less-than-or-equal-to 800 inches per minute?"

If a "YES" output, sequence step 212 sets the air temperature, $T_{air}$ to the idle temperature, $T_{DES}$. If a "NO" output, sequence step 214 sets the air temperature, $T_{air}$, to the "Result" calculated in sequence step 206.

$T_{air}$ input to decision step 216 is compared to $T_{DES}$; if less-than-or-equal-to $T_{DES}$, control 28b is set at $T_{air}=T_{DES}$. If not less-than-or-equal-to $T_{DES}$, control 28b is set at the value for $T_{air}$ input to decision step 216.

The routine ends at sequence step 218.

The independent heating chute and hot air distribution box subsystems will run automatically, governed by their respective controls 28a,b until the CNC 16a ceases tape laying runs, at which time the controls 28a,b will reset to zero.

While the invention has been shown in connection with a preferred embodiment, it is not intended to so limit the invention. Rather, the invention extends to all such designs and modifications as come within the scope of the appended claims.

What is claimed is:

1. Apparatus for heating to a processing temperature fiber reinforced composite tape travelling along a tape path for application to a surface at a tape laydown point, comprising:
   first heating means proximal one face of said tape, for transferring heat to said tape from said one face;
   second heating means proximal the opposite face of said tape, for heating said tape; and
   means for controlling said second heating means in response to the temperature of fluid in fluid communication with said opposite face of said tape.

2. The apparatus of claim 1, wherein said first heating means includes a thermally-conductive chute member.

3. The apparatus of claim 2, wherein said second heating means includes an air supply manifold, and wherein said fluid is air.

4. The apparatus of claim 3 wherein said first and second heating means are located along said tape path at correspondingly-disposed positions.

5. Apparatus for heating to a processing temperature fiber reinforced composite tape travelling along a tape path for application to a surface at a tape laydown point, comprising:
   a tape chute located along said tape path, and having a chute face disposed toward one face of said tape, said tape chute having a thermal mass;
   an air distribution manifold located along said tape path in correspondence with said tape chute, and having an air outlet face disposed toward the opposite face of said tape;
   chute heating means for heating said chute face to a predetermined temperature;
   air heating means for heating air supplied to said air distribution manifold; and
   control means for controlling said air heating means in response to air temperature proximal said opposite face of said tape.

6. The apparatus of claim 5, wherein said chute face is contiguous with said one face of said tape.

7. A method of heating to a processing temperature fiber reinforced composite tape travelling along a tape path for application to a surface at a tape laydown point, comprising:
   generating a heated surface adjacent one face of said tape thereby heating said tape;
   generating a heated air stream;
   sensing the air temperature proximal the opposite face of said tape at a tape path location corresponding to the heated surface; and
   directing said heated air stream against said opposite face of said tape in response to said air temperature;

8. The method of claim 7, wherein said step of directing said air stream further includes the step of:
   controlling the flow rate of said heated air stream.

9. The method of claim 7, further including:
   controlling the temperature of said heated surface by a closed-loop heating control system.

* * * * *